Sept. 20, 1927.  C. T. WESTLAKE  1,642,862
CAR TRUCK
Filed March 28, 1925   2 Sheets-Sheet 1
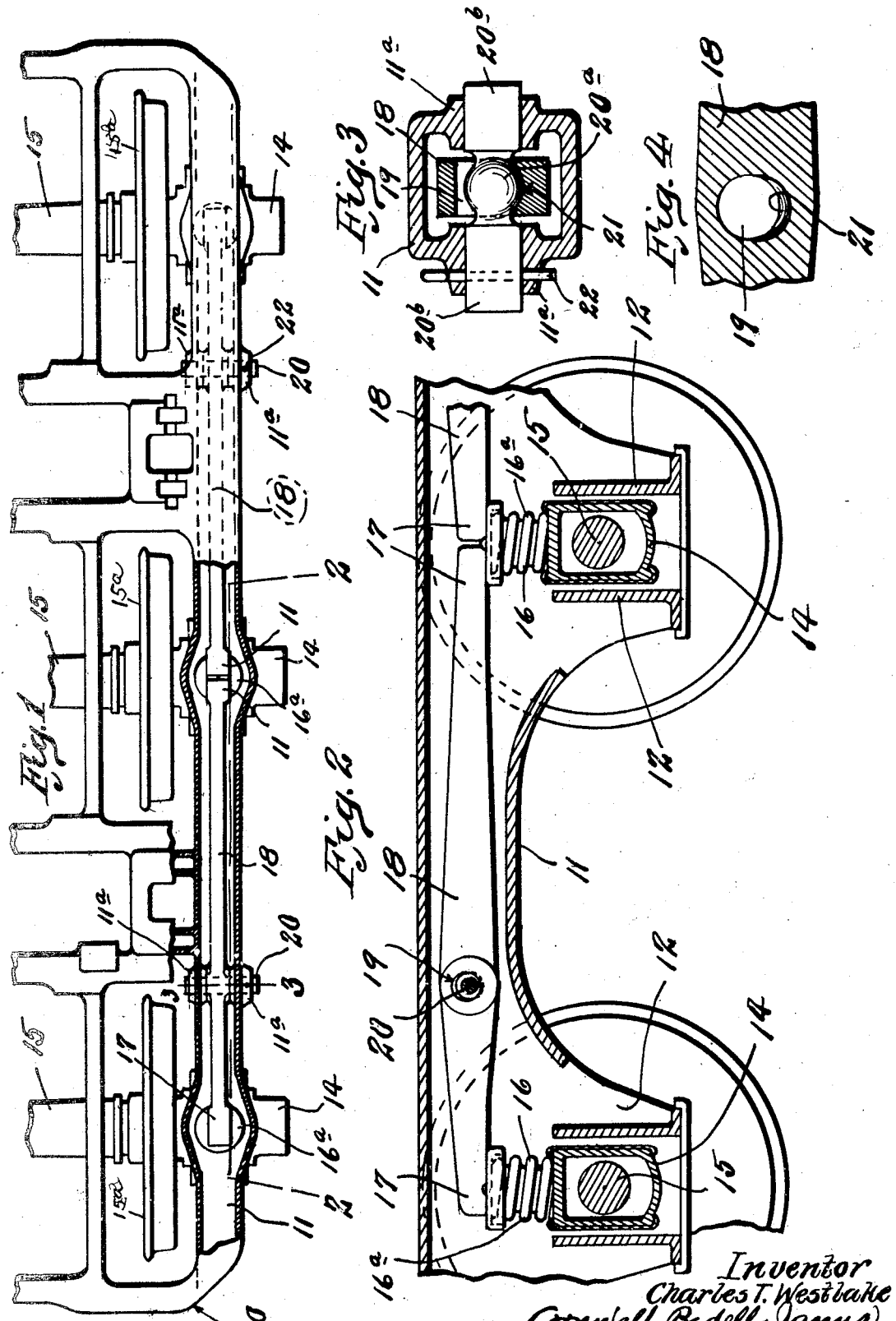
Inventor
Charles T. Westlake
By Cornwall, Burdell-Janus
Att'ys.

Sept. 20, 1927.　　　　C. T. WESTLAKE　　　　1,642,862
CAR TRUCK
Filed March 28, 1925　　　2 Sheets-Sheet 2
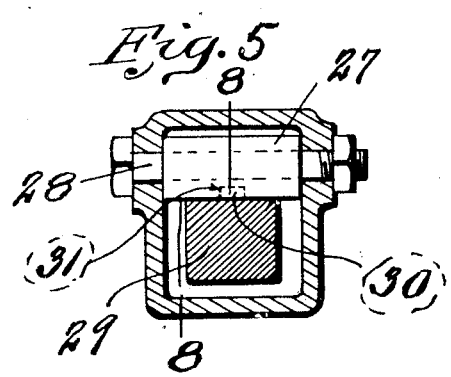
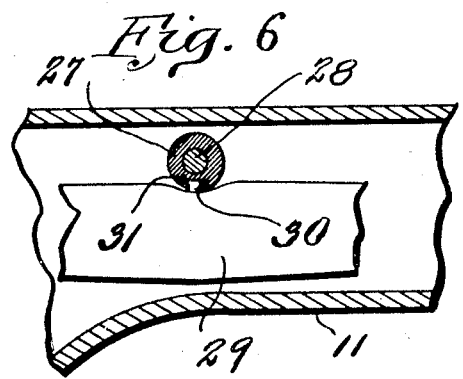
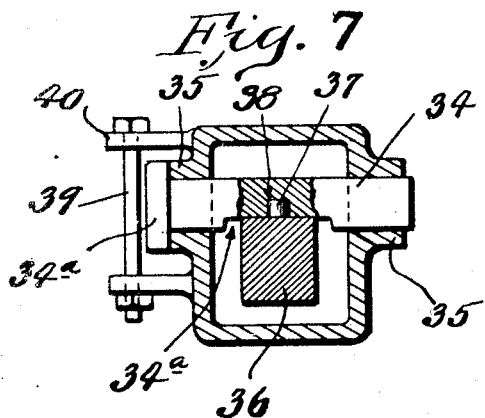
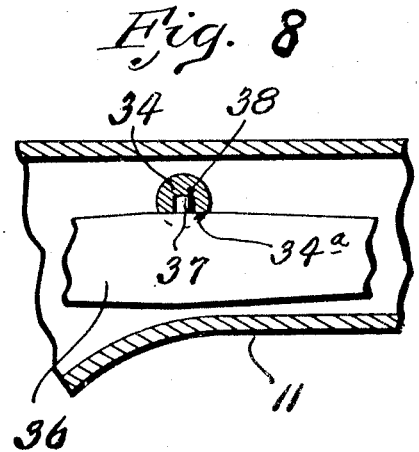
Inventor
Charles T. Westlake
Cornwall, Bidell & Janus
By　　　　　　Attys.

Patented Sept. 20, 1927.

1,642,862

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK.

Application filed March 28, 1925. Serial No. 19,128.

This invention relates to new and useful improvements in railway car trucks and has for its object the provision of a car truck having equalizer bars mounted therein for pivotal movement both in vertical and horizontal planes extending transversely of the truck.

In railway car trucks having equalizers pivoted to the wheel pieces of the frame and supported at their ends by springs bearing on the journal boxes, such equalizers are subjected in operation to movements about their pivots due to different levels of opposite track rails, thereby causing the journal boxes at opposite sides of the track to rise and fall relative to each other. Such equalizers are also subject to horizontal movements about their pivots due to the lateral play of the axles and journal box and pedestals, and it is the object of my invention to accommodate these two movements by mounting each equalizer bar so that it is movable about its pivot in both directions without interfering with its normal pivotal movement in a plane extending longitudinally of the truck.

With these and other detail objects in view, my invention consists in certain novel features of construction and arrangement of parts, hereinafter more fully described and claimed, and illustrated in the accompanying drawings, in which—

Figure 1 is a fragmental plan view of a car truck partly in cross section to more clearly illustrate my invention.

Figure 2 is a vertical cross section taken on line 2—2 of Figure 1.

Figure 3 is a transverse cross section taken on line 3—3 of Figure 1.

Figure 4 is a detail cross sectional view of an equalizer bar showing the pivotal seat thereof in cross section.

Figure 5 is a transverse cross section through a wheel piece and showing another modified form for pivotally mounting the equalizer bar.

Figure 6 is a vertical cross section taken on line 8—8 of Figure 5.

Figures 7 and 8 are, respectively, transverse and longitudinal cross sections of a wheel piece and showing another modified form of mounting the equalizer bar.

Referring by numerals to the accompanying drawings, 10 indicates a car truck frame having wheel pieces 11 which are preferably box-shape in cross section and are provided with pedestal jaws 12 arranged in pairs to receive journal boxes 14, which latter form bearings for axles 15 carrying wheels 15ª.

Bearing on top of journal boxes 14 are coiled springs 16, the upper ends of which receive caps or spring followers 16ª on which rest the respective ends 17 of equalizer bars 18, which are operatively disposed within wheel pieces 11. Each equalizer bar 18 is provided at the appropriate point with a horizontally disposed opening 19 arranged transversely in said equalizer bar for receiving a pivot member 20. This pivot member or pin 20 extends transversely through the wheel piece and has its ends seated in bearings 11ª formed integrally with the vertical walls of each wheel piece 11. Thus the ends of said equalizer bar are permitted to move in a vertical direction in correlation with the respective journal boxes.

In order to provide for horizontal movement of the ends of said equalizer bar, whereby the latter can accommodate itself to the lateral play of axles and journal box parts, each equalizer bar is so mounted on its pivot that a limited pivotal movement in a horizontal plane is permitted to such bar. In the preferred form, this is accomplished by providing pin 20 with an intermediate spherical portion 20ª which is engaged by the concave seat 21 formed in the lower portion of opening 19. In this manner the equalizer bar has a ball and socket engagement with the wheel piece thereby permitting pivotal movement of said bar in both vertical and horizontal planes extending transversely of the truck. The spherical portion 20ª is substantially of the same diameter as the cylindrical portion 20ᵇ of pin 20 in order to permit insertion of said pin in position in the wheel piece.

The pivotal seat in the equalizer bar is made by first forming the opening 19 which is of substantially the same diameter as the diameter of pin 20 and then milling the lower half of said opening to form the concave seat 21. When pin 20 is in position in the wheel piece, it is held against withdrawal by a retaining member, such as a cotter pin 22, seated in one of the bearings 11ª and passing through said pin.

The modified form illustrated in Figures 5 and 6 discloses a sleeve 27 freely mounted on a horizontally disposed bolt or pin 28 which extends transversely through the wheel piece and has its ends seated in the side walls thereof a suitable distance below the top wall. An equalizer bar 29 bears against sleeve 27 and is provided with an upwardly projecting pin 30 which is freely seated in a recess 31 disposed radially in said sleeve. In this manner pin 30 and recess 31 form pivotal interengagement between said sleeve and the equalizer bar so that the latter can move in a horizontal plane with pin 30 as the pivot and at the same time said equalizer is pivotally movable in a vertical plane with pin 28 as the pivot.

In the form shown in Figures 7 and 8 a horizontally disposed pin 34 extends transversely through the wheel piece and has its ends rotatably seated in bearings 35 formed in the side walls of the wheel piece. An equalizer bar 36 rests against the flat face 34$^a$ formed in the lower portion of said pin and is provided with an upwardly projecting pin 37 which is pivotally seated in a downwardly presented recess 38 formed in said flat surface 34$^a$. Pin 34 freely seated in bearings 35 forms a pivot for permitting pivotal movement of the equalizer bar in vertical plane while pin 37 seated in recesses 38 acts as a pivot during the horizontal pivotal movement of said bar. Pin 34 is held against displacement by means of a bolt or cotter pin 39 which is disposed immediately in front of the head 34$^b$ of pin 34 and prevents the withdrawal of the latter from operative position. Member 39 is carried by lugs or ears 40 which are preferably formed integral with and project outwardly from one side of wheel piece 11.

I claim:

1. In a railway truck, a wheel piece, an equalizer bar, a removable member in said wheel piece and engaging said equalizer bar for permitting the pivotal movement thereof both in vertical and horizontal planes extending transversely of the truck.

2. In a railway truck, a wheel piece, an equalizer bar, a removable member in said wheel piece and engaging said equalizer bar for permitting the pivotal movement thereof both in vertical and horizontal planes extending transversely of the truck, and means for retaining said member in operative position in said wheel piece.

3. In a railway truck, a wheel piece having spaced vertical walls, an equalizer positioned between said walls, a pin extending through said wheel piece and said equalizer, and a universal joint connection between said equalizer and pin whereby said equalizer supports said wheel piece through said pin and may tilt in vertical and horizontal planes extending transversely of the truck.

4. In a railway truck, a wheel piece having spaced vertical walls provided with opposing bosses, a pin extending transversely of said walls and seated in said bosses, an equalizer extending longitudinally of said wheel piece and engaging said pin, there being a ball and socket bearing between said pin and equalizer.

5. In a railway truck, a wheel piece having spaced vertical walls provided with opposing bosses, a pin extending transversely of said walls and seated in said bosses and having a spherical surface intermediate its ends, an equalizer disposed between said walls and having a transverse opening adapted to have said pin passed therethrough, there being a spherical recess in said opening for engaging the spherical portion of said pin.

In testimony whereof I hereunto affix my signature this 24th day of March, 1925.

C. T. WESTLAKE.